Sept. 24, 1935.   C. H. BISSELL   2,015,544
SWITCH MOUNTING
Filed July 21, 1933
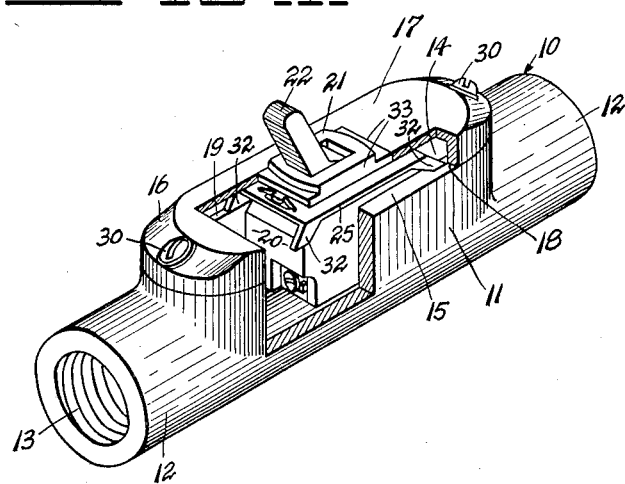
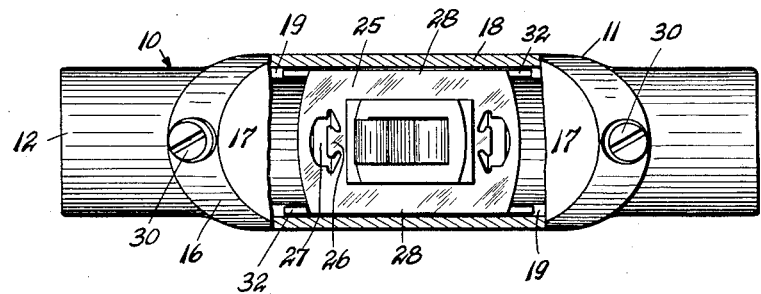
INVENTOR:
Carl H. Bissell,
BY Bodell & Thompson
ATTORNEYS.

Patented Sept. 24, 1935

2,015,544

UNITED STATES PATENT OFFICE 2,015,544

SWITCH MOUNTING

Carl H. Bissell, Syracuse, N. Y., assignor to Crouse-Hinds Company, Syracuse, N. Y., a corporation of New York Application July 21, 1933, Serial No. 681,548

4 Claims. (Cl. 247—20)

This invention relates generally to electrical outlet fixtures, and more particularly to a means for securing an electric switch to, or in, an electric conduit fitting.

The invention has for its object, the provision of means for securing a switch of the type usually employed in conjunction with standard outlet boxes to a standard electrical conduit fitting.

A further object of the invention is the provision of means for securing such a switch to a conduit fitting without changing the design, or causing any additional machining to be done to the conduit fitting.

The invention consists in the novel features and in the combinations and constructions hereinafter set forth and claimed.

In describing this invention, reference is had to the accompanying drawing in which like characters designate corresponding parts in all the views.

Figure 1 is a perspective view of the conduit fitting and switch, and switch supporting means, parts of the fitting and cover being cut away.

Figure 2 is a plan view of the fitting with the cover partly broken away, and partly in section, showing the switch mounted in the fitting.

This invention comprises generally, an electrical conduit fitting formed with an opening in one side thereof, an electric switch, a support member secured to the switch and having portions overlapping the margin of the fitting about the opening, a cover for the open side of the fitting, the cover coacting with the support member to secure the same to the fitting, and means for detachably securing the cover to the fitting.

10 designates the conduit fitting which, as here shown, includes a body portion 11, and hub portions 12 which are threaded internally, as at 13, to receive the threaded ends of the conduit. One side of the body 11 is provided with an opening 14 which is surrounded by an annular margin 15. As here shown, the margin 15, or the face of the opening, is oblong in general form. The cover 16 provides a closure for the opening, and is formed with a top portion 17, and an annular flange having a margin 18 coacting with the margin 15. When the cover 16 is secured to the fitting, the margin 18 rests upon the margin 15. As here shown, the margin 18 is of less width than the margin 15, the outer edge of the margin 18 being flush with the outer edge of the margin 15, thereby forming an annular ledge 19 about the opening 14 when the cover is in place. The top 17 of the cover is provided with a rectangular opening located centrally thereof to receive the protruding portion of the switch face 21.

20 designates an electrical switch, the body of which is rectangular in general shape, the outer surface, or face of the body, being reduced in dimensions so as to form an annular ledge about the face 21 of the switch. An operating manual 22 projects outwardly from the face 21 through the opening in the cover, the switch here shown being of the ordinary toggle action type. This type of switch is usually employed in domestic wiring to control light circuits and the like, and is usually mounted in a sheet steel outlet box, the mounting consisting of a bridge secured to the switch and having its ends overlapping the face of the outlet box, and being secured thereto by screws. Frequently, it is desired to install a switch of this type in a conduit run, and this invention relates to mechanism for securing this type of switch in an ordinary conduit fitting. The conduit fitting here shown is usually employed as a junction box for the splicing of the electric conductors.

25 designates a supporting member, here shown as fabricated from sheet metal and secured to the switch. This support member 25 is secured to the switch, here shown, by forcing the partitions 26 into indentations or slots formed in the vertical end walls of the face 21 of the switch. This is usually effected by inserting a screw driver, or other tool, in the slot or opening 27 and forcing the partition 26 toward the switch causing the inner side of the partition 26 to enter the slot formed in the end walls of the face 21.

The switch described, and the method of securing the support member 25 thereto, forms no part of this invention. As far as the invention is concerned, the support 25 may be secured to the switch in any suitable manner, as for example, by means of screws, or the like. The support member 25 is formed with portions 28 which overlap and engage the margin 15 of the conduit fitting.

The height of the annular flange of the cover is such that the distance between the top portion 17 of the cover and the margin 15 of the fitting is slightly less than the distance from the top of the support member 25 to the marginal surface 15. Accordingly, when the cover is tightly secured to the fitting, the top portion 17 of the cover coacts with, or presses downwardly against, the support member 25 and forces the overlapping edges 28 tightly against the marginal surface 15. The cover is secured to the fitting in any suitable manner, as here shown by screws 30 which are provided at their inner ends with clamping means, or which thread into threaded bosses formed in the fitting at the ends of the opening.

If it is desired to establish a tight joint between the marginal surfaces 15, 18 of the fitting and cover respectively, a gasket may be inserted between these surfaces in which instance the support member 25 is provided with marginal lapping portions having a slight resilient action. As shown in the drawing, the supporting member 25 is provided with downwardly extending projections or legs 32, the lower ends of which rest upon the marginal surface 15, or ledge 19, above the opening in the fitting. As here shown, the support member 25 is provided with a pair of legs arranged in spaced apart relationship on each side of the support member. Due to the resilient action of these leg portions, the support member 25 is clamped rigidly against the marginal surface 15 of the fitting, and the marginal surface 18 of the cover may also be secured tightly against the margin 15. If a gasket is inserted between the cover and the fitting, obviously, the length of the legs 32 will depend upon the thickness of the gasket, and will be such length as to permit the switch and support member 25 to be depressed into the opening of the fitting as the gasket is compressed by the cover.

Lateral or lengthwise movement of the switch and the support 25 is prevented by the vertical surfaces 33 of the switch face coacting with the edges of the opening formed in the tube 17 of the cover.

By my invention, I have provided a means for detachably mounting an electric switch into a standard conduit fitting without in any way impairing the fitting for ordinary use and purposes, and a means by which the switch is secured in the fitting with a minimum consumption of time and energy.

What I claim is:

1. An electrical conduit fitting formed with an opening in one side thereof, a cover for said opening, an electric switch, a support member secured to the switch and having portions partially overlapping the margin of the fitting about the opening, the cover being formed with an annular margin of less width than the margin of the fitting about the opening, the top portion of the cover coacting with the support member to move said member toward the fitting when the cover is secured to the fitting, and means for detachably securing the cover to the fitting.

2. An electrical conduit fitting formed with an opening in one side thereof, a cover for said opening having a depending annular flange coacting with the margin of the fitting about the opening, and said flange being of less thickness than the margin of the fitting, an electric switch, a support member secured to the switch and having portions overlapping the margin of the fitting within the flange of the cover, the top portion of the cover being arranged to coact with the switch support to hold the same against the margin of the fitting, and means for securing the cover to the fitting.

3. An electrical conduit fitting formed with an opening in one side thereof, an electric switch, means for detachably mounting the switch in said opening including a support member secured to the switch and having depending leg portions engaging a portion of the annular margin about the opening in the fitting, a cover for the open side of the fitting provided with a depending annular flange surrounding the support member and leg portions, the cover coacting with the support member to hold the same in engagement with the fitting when the cover is secured in place, and means for detachably securing the cover to the fitting.

4. An electrical conduit fitting formed with an opening in one side thereof, an electrical switch, and means for detachably mounting the switch in said opening including a switch support member having portions engaging the annular margin about the opening in the fitting, a cover for the open side of the fitting, said cover being provided with a recess for receiving the switch support member, the cover coacting with the support member to hold the same in engagement with the fitting when the cover is secured in place, and means for detachably securing the cover to the fitting.

CARL H. BISSELL.